3,399,182
POLYMERIZATION CATALYST CONSISTING OF TiCl$_3$, R$_3$Al, AND TRIETHYLAMINE DIAMINE
Adalbert Farkas, Media, Pa., assignor to Air Products and Chemicals, Inc., Philadelphia, Pa., a corporation of Delaware
No Drawing. Filed July 29, 1963, Ser. No. 298,470
2 Claims. (Cl. 260—93.7)

This invention relates to catalyst systems suitable for the preparation of steroregular polymers of alpha olefins such as polypropylene and is particularly concerned with catalyst systems comprising titanium trichloride, trialkylaluminum, and a tertiary amine.

As explained in the Anderson et al. U.S. Patent 3,050,471, tertiary amines are effective in modifying the effectiveness of catalysts of the Ziegler type comprising a halide of a transitional metal in an intermediate state and a metal alkyl compound such as trialkyl aluminum, each alkyl group having from 1 to 8 carbon atoms. A considerable portion of the research work on catalysts of this system has been directed toward achieving a maximum concentration of crystallinity in the polymer, inasmuch as the presence of more than about 5% of the noncrystalline material in the polymer does impair the usefulness of the material for fibers and for certain other purposes.

In accordance with the present invention, an advantageous increase in the speed and rate of polymerization is achieved by the utilization of triethylenediamine as the tertiary amine in a Ziegler type catalyst comprising titanium trichloride and trialkyl aluminum.

The nature of the invention is further clarified by reference to the following examples.

Example I

The apparatus for catalyst evaluation included a 1 liter flask, a stirrer, addition funnels, and a nitrogen flushing system. The flask contained 250 ml. of decahydronaphthalene to which was added 612 mg. (4 millimols) of titanium trichloride (Anderson grade AA, aluminum reduced, activated purple crystalline) and then 146 mg. (1.3 millimols) of triethylenediamine. The solution was aged for 17 hours. To the aged solution of titanium trichloride and triethylenediamine in decahydronaphthalene, there were added 2.38 g. (12 millimols) of triisobutyl aluminum. The solution was heated to 110° C. and propylene introduced during a period of one hour. The polymerization reaction was quenched by the addition of isopropyl alcohol. The polymeric material was recovered following the procedure outlined at p. 205 of "Preparative Methods of Polymer Chemistry" by Sorenson and Campbell. In order to determine the amount of crystallinity, a portion of the dried polymer was extracted with boiling heptane for 24 hours.

In a control procedure, the same method was followed in every respect except that the 146 mg. of triethylene diamine were replaced by 131 mg. 1.3 millimols) of triethylamine.

In a comparison of hte results, the difference between the amount of crystallinity achieved by the two catalyst systems was not spectacular. The use of the conventional triethylamine provided a control product designated as 64% crystalline. That is 64% of the control product was not dissolved by boiling extraction with heptane. Thus the control was only slightly inferior to the 65% insoluble polypropylene resulting from the use of triethylenediamine.

Particular attention is directed to the fact that the rate of reaction was significantly greater by the use of triethylenediamine. Thus, the yield of polypropylene during the one hour test was only 12.2 g. when triethylamine was employed, but was 115% greater or 26.2 g. when triethylenediamine was employed in the catalyst system. Expressed as pounds of solid polypropylene per hour per pound of catalyst per hour, the use of triethylamine provided 3.9#/#/H, or less than half the 8.4#/#/H achieved by the use of triethylenediamine at atmospheric pressure. More rapid reaction rates would be expected at higher pressure.

Example II

An evaluation of a catalyst system utilizing triethylenediamine in combination with triisobutyl aluminum and titanium trichloride was conducted following the procedure of Example I, but substituting 0.7 millimol of triethylenediamine instead of 1.3 millimols. Thus the ratio of triethylenediamine to titanium trichloride was about 0.18:1.00. The yield of polypropylene was 28 g., of which 62% was undissolved after heptane extraction. Thus, the triethylenediamine is effective as a promotor for such titanium trichloride, trialkyl aluminum catalyst systems, even when present in a significant but relatively minor amount. By a series of tests, it is established that when using about three moles of trialkyl aluminum and one mol of titanium trichloride, the ratio of triethylenediamine should be significant but not more than about one mol per mol of titanium trichloride (if a maximum reaction rate is desired). However, operable catalysts comprising 4 and 6 mols of triethylene diamine per mol of titanium trichloride plus 3 mols of aluminum have been demonstrated, whereby polymers having increasingly better crystallinity (up to 70%) are achieved.

By a series of tests, it is established that the alkyl groups in the lower trialkyl aluminum should be the conventional lower alkyl groups for Ziegler catalysts, generally having from 1 to 8 carbon atoms per alkyl group. By a series of tests, it is established that the ratio of trialkyl aluminum to titanium chloride should be within the range which is conventional in accelerated catalysts systems, being more than 1:1 but less than about 6:1 and conveniently 3:1.

Example III

A catalyst system was evaluated following all details of Examples I and II, except for the utilization of 4 millimols of triethylenediamine thus providing the maximum 1 to 1 ratio of triethylenediamine to titanium trichloride. The yield of polypropylene was only 18.2 g., thus indicating that the molar concentration of the triethylenediamine should not be significantly greater than the molar concentration of titanium trichloride. The polypropylene was extracted with hot heptane, leaving a crystalline residue of 70%.

Example IV

A catalyst was evaluated following the procedures of previous examples except aging the mixture of titanium trichloride and triethylenediamine for only 30 minutes instead of 17 hours. By the use of 1.3 millimols of triethylenediamine per 4 millimols of titanium trichloride, the yield of polypropylene was 19.4 g. Because the yield was much less when the same proportion of components was used after the triethylenediamine had been aged with one of the other components for only 30 minutes than when aged for 17 hours, the data were interpreted as establishing that the aging was of critical value in achieving the optimum reaction rate for the polymerization. The heptane insoluble fraction constituted 67% when the aging of the triethylenediamine with one of the group consisting of trialkyl aluminum and titanium trichloride was conducted for a short period, and because this was almost the same as the 65% crystallinity of Example I, the data were interpreted as establishing that the selectivity of the catalyst system was not significantly altered by such aging.

Many modifications and variations of the invention may be made without departing from the scope and spirit as hereinbefore set forth, and therefore only such limitations should be imposed as are set forth in the claims.

The invention claimed is:

1. In the method of polymerizing propylene in an inert solvent containing a stereo specific catalyst system featuring more than one mol of trialkyl aluminum per mol of titanium trichloride but less than about six mols of trialkylaluminum per mol of titanium trichloride, the improvement which consists of employing more than one but not more than about six mols of triethylenediamine per mol of titanium trichloride as an accelerator.

2. In the method of polymerizing propylene in an inert solvent containing a stereospecific catalyst system, the improvement which consists of employing a temperature of about 110° C. for the polymerization and employing a mixture of triethylenediamine, trialkylaluminum, and titanium trichloride as the catalyst system, there being more than one mol of trialkylaluminum per mol of titanium trichloride, but less than about six mols of trialkylaluminum per mol of titanium trichloride, and there being more than one but not more than about six mols of triethylenediamine per mol of titanium trichloride.

References Cited

UNITED STATES PATENTS

| | | | |
|---|---|---|---|
| 3,189,590 | 6/1965 | Coover et al. | 260—93.7 |
| 3,147,240 | 9/1965 | Coover et al. | 260—93.3 |
| 3,050,471 | 8/1962 | Anderson et al. | 260—93.7 |
| 3,099,647 | 7/1963 | Jezl et al. | 260—93.7 |

JOSEPH L. SCHOFER, *Primary Examiner.*

M. KURTZMAN, *Assistant Examiner.*

UNITED STATES PATENT OFFICE
CERTIFICATE OF CORRECTION

Patent No. 3,399,182                                            August 27, 1968

Adalbert Farkas

It is certified that error appears in the above identified patent and that said Letters Patent are hereby corrected as shown below:

In the heading to the printed specification, line 3, "TRIETHYLENEAMINE DIAMINE" should read -- TRIETHYLENE DIAMINE --. Column 1, line 11, "steroregular" should read -- stereoregular --; line 60, "hte" should read -- the --.

Signed and sealed this 3rd day of February 1970.

(SEAL)
Attest:

Edward M. Fletcher, Jr.                                WILLIAM E. SCHUYLER, JR.
Attesting Officer                                               Commissioner of Patents